Sept. 17, 1957 C. C. QUANTZ 2,806,962
REGULATING DEVICE
Filed Sept. 27, 1956 2 Sheets-Sheet 1
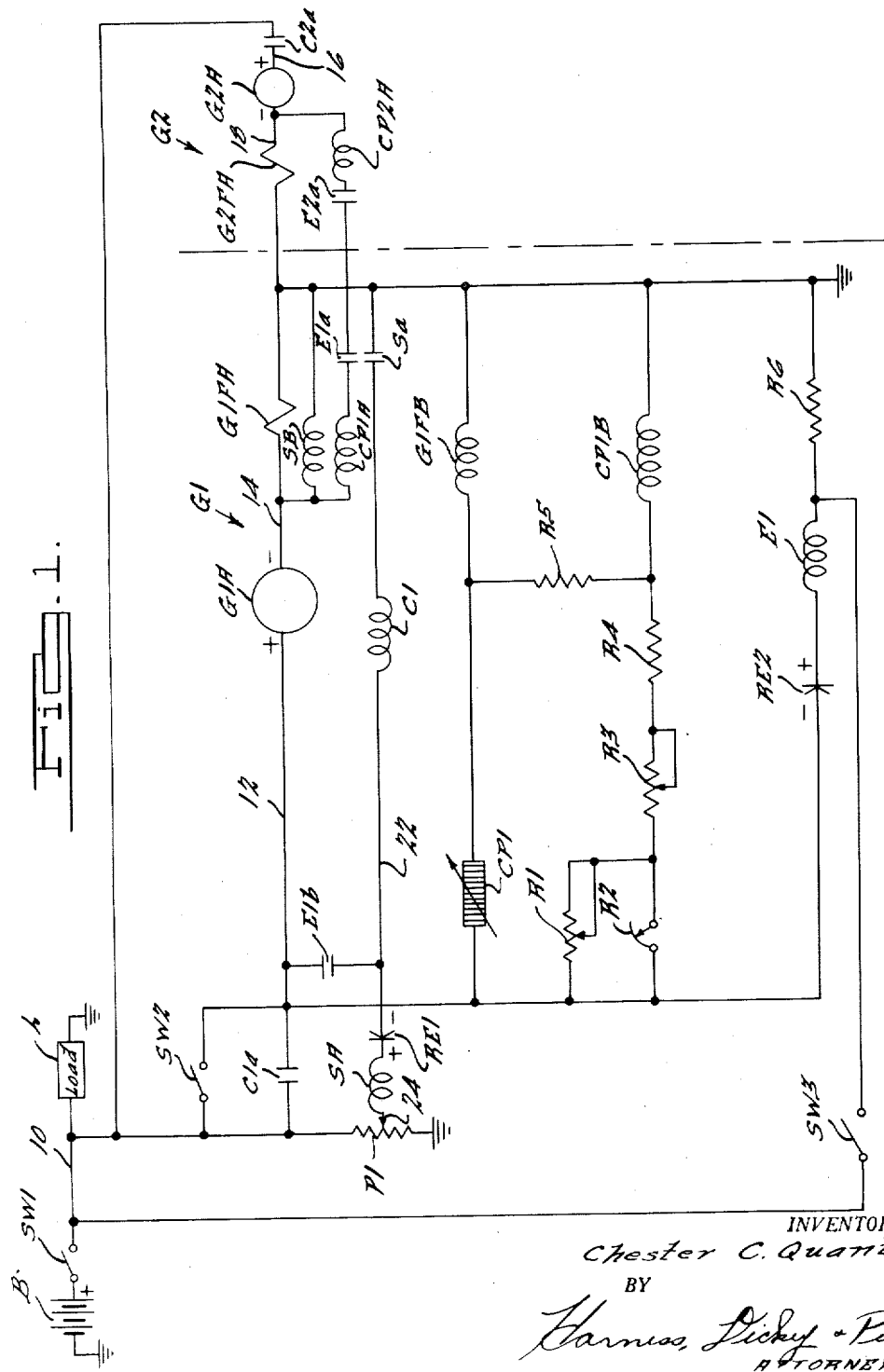
INVENTOR.
Chester C. Quantz.
BY
Harness, Dickey & Pierce.
ATTORNEYS.

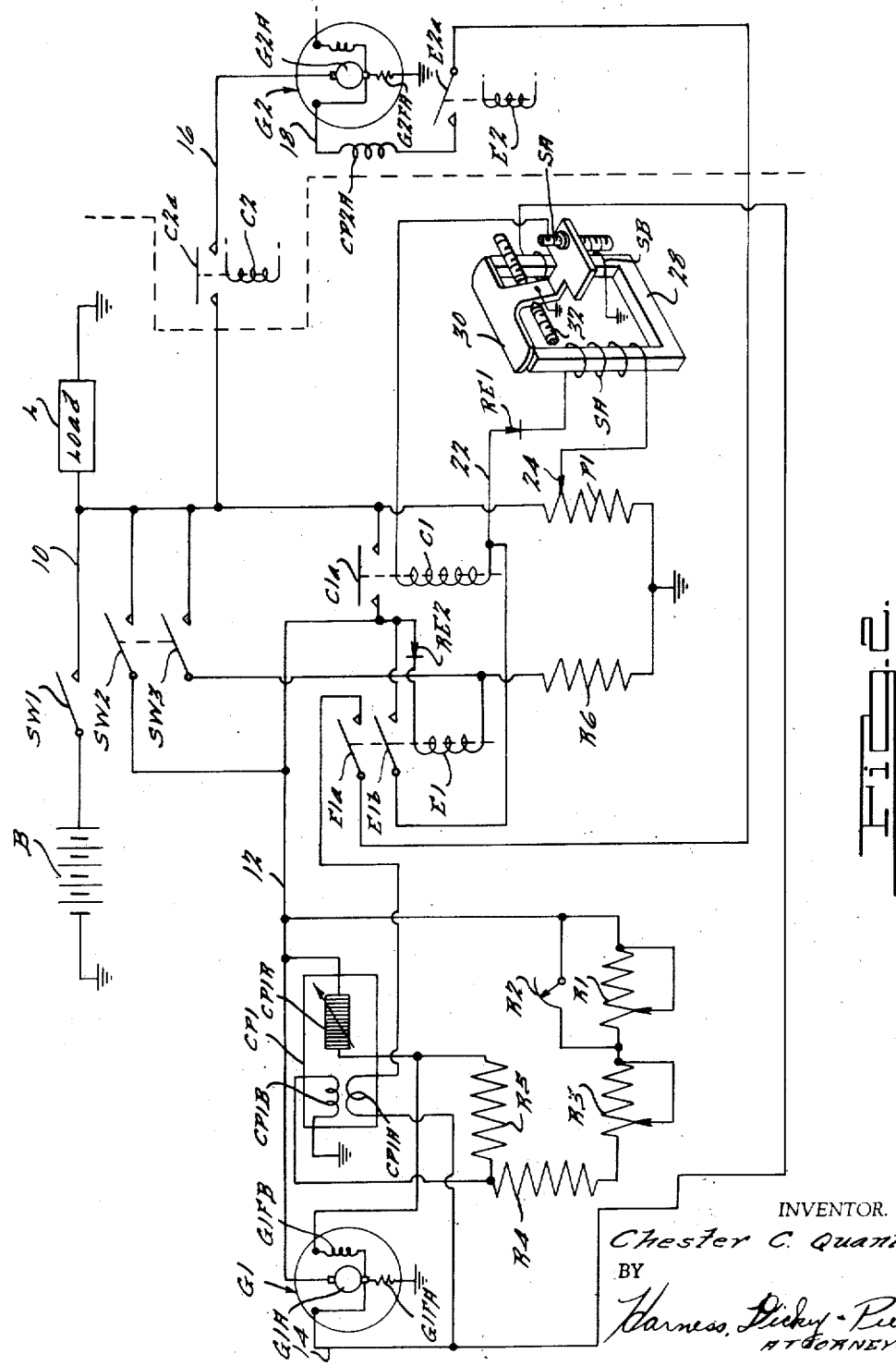

United States Patent Office 2,806,962
Patented Sept. 17, 1957

2,806,962

REGULATING DEVICE

Chester C. Quantz, Wayne, Mich., assignor to Electro-Mechanical Products Co., Garden City, Mich., a Michigan corporation Application September 27, 1956, Serial No. 612,404

8 Claims. (Cl. 290—31)

This invention relates to power supply systems, and more particularly to apparatus for regulating and controlling a battery-generator type of power supply system.

While the principles of the invention are general in their applicability, they are representatively embodied in an arrangement for regulating and controlling a compound generator adapted to supply relatively large currents. In that representative arrangement, means are provided for selectively connecting the generator with and disconnecting the generator from the battery and load, for regulating the magnitude of the generator output, for equalizing the outputs of a pair of generators, and for enabling the generator to be utilized as an auxiliary motor.

The first of these functions is performed to permit the generator to charge the battery and supply the load, but to prevent any substantial dicharging of the battery through the generator. In common practice, one pair of like poles of the battery and generator are interconnected by a ground return, while the other pair of like poles are selectively interconnectable by a pair of electrical contacts. With those contacts open, the magnitude and polarity of the voltage thereacross is indicative of the relation between the output voltages of the generator and battery. Therefore, electromagnetic means, such as a relay, may be employed to sense that voltage and close the contacts when the generator output becomes adequate.

However, upon that closure, the voltage across the contacts is reduced effectively to zero. To avoid a consequent relase of the sensing relay, that relay has commonly been endowed with a self-latching characteristic by employing a permanent magnet to retain the armature in its operated position. To disconnect the generator from the battery under the appropriate conditions, an additional releasing winding has been employed, normally being connected to sense reverse current.

It has been difficult to design relays to fulfill this function satisfactorily. The air-gap adjustments have been critical, malfunctioning due to attracted metallic particles has been frequent, and the cost has been high. Additionally, the use of self-latching devices of this nature has frequently led to system malfunctioning. Thus, if after the generator has been connected to the battery and load and the sensing electromagnet has been latched, the system master switch is opened before operation of the engine has terminated, the sensing relay remains operated since the source of sensible reverse current has been removed. As a result, when the system is next placed in use, the power supply system output voltage can at least momentarily sufficiently exceed its nominal value to destroy load components.

Consequently, the objects of this invention are to improve the effectiveness and stability and to reduce the cost of manufacture and maintenance of bi-directional voltage-differential sensing systems.

An equalizing relay has customarily been employed as an element of the aforesaid means for regulating the magnitude of the generator output and for equalizing the output of a pair of generators. If the last of the above-noted functions is to be performed, that of permitting the generator to be utilized as an auxiliary motor, those means must be temporarily disabled. In the prior practice, a relay specific to this function has been provided. Consequently, another object of this invention is to reduce the cost of voltage-control systems by eliminating the need for providing a separate disabling relay without dispensing with the function.

The manner of accomplishing the foregoing objects, and other objects and features of the invention, will be perceived from the following detailed description of an embodiment of the invention when read with reference to the accompanying drawings in which:

Figure 1 is a schematic representation of a system embodying the principles of the invention; and Fig. 2 is a schematic representation of the circuit of Fig. 1 redrawn to better illustrate the physical relationship between the subelements of the combination.

It is applicant's intention that Figs. 1 and 2 of the drawings represent identical electrical circuits and the following detailed description of the operation of the preferred arrangement may be read with reference to either Fig. 1 or Fig. 2, or both, as the reader desires. Fig. 2 of the drawings contains a more detailed illustration of the conventional double-wound electro-magnetic relay described hereinafter. In constructed units, the relay including windings SA and SB and contacts Sa was purchased, prior to the filing date of the present application. The relay bears the patent marking 2,425,092 and reference may be had to that patent for a more detailed description of the constructional characteristics of the relay.

Referring to Fig. 1 or Fig. 2 of the drawing, the system with which the subject control arrangement is associated includes a battery B, a master switch SW1, a load L, a generator G1, and, if desired, a generator G2. In the representative arrangement disclosed, the negative pole of battery B is connected to the system ground and the positive pole is connectable through switch SW1 and conductor 10 to load L, which is also returned to ground. The positive terminal of the armature G1A of generator G1 is connectable to conductor 10 via conductor 12 and control contacts C1a. The negative terminal of armature G1A is connected to ground over conductor 14 and through the series field winding G1FA of generator G1. Similarly, if desired, conductor 10 may be connected through control contacts C2a and via conductor 16 to the positive terminal of armature G2A of the second generator G2, the negative terminal of that armature being connected over conductor 18 and through the series field winding G2FA of generator G2 to the system ground.

In a reduction to practice of the subject invention, the nominal system voltage, that is, the nominal voltage appearing between conductor 10 and ground was twenty-four to twenty-eight volts and each of the generators G1 and G2 was capable of supplying up to 400 amperes of current at that voltage, each of the pairs of control contacts C1a and C2a also being capable of carrying 400 amperes continuously. Generator G1 is a self-excited compound generator having an armature G1A, a series field G1FA, and a shunt field G1FB, regulation of the output of that generator being achieved, in the disclosed arrangement by controlling the magnitude of the current through the shunt field G1FB. Generator G2 is assumed to be identical to generator G1 but its shunt field circuit is omitted in the drawing.

When master switch SW1 is closed, the voltage of battery B appears between conductor or bus 10 and ground; and in the course of the following discussion it will be assumed that this voltage is 27.5 volts. Since electrical contacts C1a are normally open, that battery voltage does not appear between conductor 12 and ground at this time. When the source of motive power which drives generator G1 is placed into operation, generator G1 produces an output voltage which rises with increasing generator speed, that voltage appearing between conductor 12 and ground. This output voltage is impressed across a series circuit including rectifier RE2, the winding of relay E1 and resistor R6. When this voltage arises to a preselected positive value with respect to ground, representatively 20 volts, the current through that series circuit and through the winding of relay E1 is sufficient to produce operation of that relay and the resultant closure of its two sets of contacts E1a and E1b. Rectifier RE2 is provided to insure that the polarity of the output voltage of generator G1 is correct since if for any reason the residual magnetism of generator G1 is reversely poled, then the output of that generator, appearing between conductor 12 and ground, will be negative. If this occurs, rectifier RE2 will prevent energization of relay E1 and the remaining elements of the system will not function. As is well known in the art, the improper polarization of the output of generator G1 may be corrected by the momentary application of 28 volts across the generator shunt field G1FB.

If generator G2 is not operating, the closure of contact E1a will have no operational effect upon the system. If generator G2 is operating, then the operation of contact E1a will initiate or prepare for the initiation of the equalizing function hereinafter to be described.

The closure of contact E1b enables the sensing apparatus which controls the connection of the generator armature G1A via conductor 12 to the system bus 10. The sensing apparatus comprises a conventional form of double-wound electromagnetic relay. In a reduction to practice of the principles of the invention, the relay comprises a generally U-shaped core structure 28 (see Fig. 2) having one winding SA disposed upon one leg and another winding SB disposed upon the other leg. The armature 30 (Fig. 2) is pivoted on an axis lying parallel to a line interjoining the centers of the core pole faces, the structure defining that pivotal axis (such as a pair of aligned screws including screw 32 engaging the armature) being no part of the electromagnetic circuit. Spring means (omitted from the drawing for clarity of representation) bias the armature away from both pole faces, the face of the armature being equidistantly spaced from both of those pole faces. The armature carries a moving contact element matable with a passive contact element, those cooperating contacts being designated Sa in the drawings, with means (such as the adjustable passive contacts illustrated in Patent 2,425,092) being provided to adjust both the released and operated air gaps, the armature never being permitted to come into physical contact with the pole faces. By virtue of this arrangement the magnetic circuits of the two windings are identical and therefore the two windings may be either in aiding or opposing relationship in their effect upon the armature depending upon the relative directions of the electrical currents through those windings.

The attainment of a voltage output from generator G1, between conductor 12 and ground, of adequate magnitude to permit that generator to be connected to the output bus 10 is detected primarily by coil SA of the sensing relay. The battery voltage appearing between conductor 10 and ground is applied across the resistive element of potentiometer P1. A selected portion of this voltage appears between the moving element of potentiometer P1 and ground, that is, between conductor 24 and ground. This reference voltage may be, for example, 26.5 volts. The difference between the voltage appearing between conductor 22 and ground is applied across serially interconnected rectifier RE1 and senser relay winding SA.

Under the previous assumption, contact E1b is closed when the voltage between conductor 12 and ground is 20 volts to apply that voltage to conductor 22. At that instant, the voltage across rectifier RE1 and winding SA has a magnitude of 6.5 volts and is of a polarity, herein labelled negative, such that rectifier RE1 offers a high impedance to conventional current flow. Assuming the generator voltage continues to rise, when the voltage between conductor 22 and ground first exceeds 26.5 volts, the polarization of the voltage difference between conductors 22 and 24 will be positive and current will flow through winding SA. In the representatively disclosed arrangement, contact Sa of the sensing relay will be closed when the voltage, under the instant circumstances, across winding SA and rectifier RE1 equals about 1.2 to 1.6 volts at the aforesaid positive polarity. Otherwise stated, closure of contact Sa will occur when the voltage between conductor 12 and ground or between condutcor 22 and ground reaches about 27.2 to 28.1 volts. Thus, with the aforesaid bus voltage of 27.5 volts, contacts Sa will be closed when the voltage at the right-hand contact of contacts C1a exceeds the voltage at the left-hand contact by an amount in the order of 0.2 to 0.6 volt.

Upon the closure of contacts Sa, the voltage appearing between conductor 22 and ground is applied across winding C1 which is an element of an electromagnetic contactor also including contacts C1a. The energization of coil C1 causes contact C1a to be closed, interconnecting conductors 10 and 12 and thereby connecting the armature of generator G1 to bus 10. Upon this closure of contacts C1a, the previously discussed voltage difference between conductor 10 and conductors 12 and 22 drops to zero, so that the voltage conductors 22 and 24 and across rectifier RE1 and winding SA is reduced by about 0.2 to 0.6 volt, that is, to about 1 volt. The current through winding SA as a result of this applied one-volt potential of the proper polarity is adequate to hold the armature operated and therefore to hold the contacts Sa closed, that is, the hold current requirements of the relay, under these cricumstances, are exceeded.

If there is no load connected so that the output current of generator G1 is effectively zero, then this hold current through winding SA is the sole source of electromagnetic flux holding contacts Sa closed. However, if load L is connected so that there is a current output from generator G1, a voltage will appear across the generator's series field winding G1FA. This voltage, between conductor 14 and ground, will, of course, be negative. Voltage of this polarity, applied across winding SB of the sensing relay S will produce current flow through that winding in a direction to aid winding SA in maintaining the armature operated and contacts Sa closed.

The system continues to operate under these conditions, the output of the generator being regulated in a manner to be hereinafter described. Whenever the driven speed of the generator G1 becomes so low that the output voltage is less than the voltage of battery B, it is necessary to disconnect the generator from bus 10 to prevent its serving as a load upon the battery. With contacts C1a and E1b closed, winding SA is disabled to sense this reduction in generator output. Consequently, the existence of conditions necessitating disconnection of the generator from the bus is sensed by winding SB of relay S. When the generator output voltage falls below that of battery B, the generator will motorize, being electrically driven by battery B, the direction of current flow through series field G1FA will be reversed from that previously described, and the voltage between conductor 14 and ground and across winding SB will become positive. As a result, the direction of current flow through winding SB is reversed and is in a direction to oppose the electromagnetic effect of winding SA, bucking or cancelling the flux generated by that winding SA. As a consequence, the armature of the relay is released and contacts Sa are opened. In the reduction to practice of the invention, the one-volt differential between conductors 22 and 24 produces a voltage across winding SA of about 0.25 volt, the remainder appearing as barrier voltage across rectifier RE1. With the employed winding, the resultant current was about 100 milliamperes. In that arrangement, in order for the effect of winding SB, coupled with the restoring force of the armature return spring, to release the sensing relay, the voltage between conductor 14 and ground has to reach a value in the order of 0.15 to 0.18 volt.

Upon the opening of contacts Sa, relay winding C1 is de-energized and the line contacts C1a are opened to disconnect bus 10 from conductor 12 and thereby to disconnect generator G1 from the bus.

The means for regulating the output of generator G1 do not depart substantially from customary practice. In general, the generator output is regulated by automatically varying a resistance in series with the generator shunt field G1FB, the variable resistor comprising a carbon pile CP1 spring biased to its low resistance value. The effects of the spring bias are electromagnetically modified by means including a voltage coil CP1B and an equalizing coil CP1A. The magnitude of the current through coil CP1B is determined in part by the magnitude of the voltage between conductor 12 and ground and a resistive network including resistors R1 to R4. Resistor R2 is manually adjustable to set the generator output, resistors R3 and R4 establish the minimum value of the network resistance, and resistor R1 establishes the maximum value of network resistance. As the generator speed increases, increasing the voltage between conductor 12 and ground, the current through the circuit including carbon pile CP1 and generator shunt field G1FB increases, increasing the excitation of the generator. Concurrently, the current through coil CP1B increases and the effect of that increased current is to oppose the action of the carbon pile biasing spring, increasing the resistance of carbon pile CP1 so as to control the magnitude of the current through field winding G1FB. Resistor R5 is provided to establish degenerative feedback from the carbon pile to its controlling coil CP1B so as to provide electrical damping of the oscillations which arise in regulating systems of the disclosed nature and to reduce the magnitude of the hunting action.

In some instances it is necessary, in view of the load requirements, to parallel a pair of generators and, as before noted, a generator G2 including an armature G2A is illustrated in the drawings. Generator G2 is or may be provided with a control system identical to that illustrated in connection with generator G1, but only parts of that identical control system are illustrated. If both generators are placed into operation, contacts E1a are closed upon the energization of coil E1, as previously described, and contacts E2a are closed by correlative means in the second control circuit. As a result, a sensing network including carbon pile equalizing coil CP1A and the correlative equalizing coil CP2A for the carbon pile in the second control circuit, is connected between conductors 14 and 18. As previously described, the voltage between conductor 14 and ground will vary as a function of the output current from generator G1, and correlatively, the voltage between conductor 18 and ground will vary as a function of the output current of generator G2. Hence, variations in the output currents of the two generators will be reflected in the magnitude and polarity of the voltage difference between conductors 14 and 18, and across equalizing coils CP1A and CP2A. If the current output of generator G1 is greater than that of generator G2, conductor 14 will be more negative than conductor 18 and the resultant current flow through equalizing coils CP2A and CP1A will be in a direction to cause the resistance of carbon pile CP1 to be increased and the resistance of the carbon pile in the second control circuit to be decreased, to establish equality. Similarly, if the current output of generator G2 exceeds that of generator G1, the current flow through the equalizing coils is in a direction to decrease the resistance of carbon pile CP1 and to increase the resistance of the carbon pile in the second control circuit.

In certain installations, it is necessary that the generator be capable of functioning as a motor to start an auxiliary engine. With generators of the noted nature, this may be accomplished by closing switch SW2 to connect the battery voltage between conductor 12 and ground. If only the thus-far circuits be provided, upon the closure of switch SW2, relay E1 will be operated, closing contacts E1b and E1a. The high-magnitude reverse current through the generator armature G1A and field G1FA produces a voltage across and a current through relay winding SB of such magnitude as to close the contacts Sa. If contact E1b is closed, then the energizing circuit for line contactor C1 is completed, and line contacts C1a are closed. If the auxiliary engine being driven by generator G1 does not start, the release of switch SW2 will not be effective to de-energize the generator since it is locked operated through contacts C1a. Additionally, if two generators are connected in parallel, the closure of contact E1a, if contact E2a were closed, would place the equalizing circuitry in operation.

For these reasons, it has been the practice to disable the relay E1 when the generator is being employed as a motor. In the prior practice, this has been accomplished by providing a separate relay having a pair of contacts controlling the energization of winding E1, those contacts being opened as an incident of preparing the generator for motorization. It has been discovered that the necessity for providing such an additional relay may be avoided. By connecting the relay winding E1 in series with a dropping resistor R6, relay E1 may be disabled by connecting the right-hand terminal of that winding to the bus 10 through a selectively actuable switch SW3. Since the left-hand end of winding E1 is connected to bus 10 through rectifier RE2 and through switch SW2, there is no operating voltage across winding E1 and no operating current therethrough. In practice, it may be desirable to mechanically gang switches SW2 and SW3.

While it will be apparent that the embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. In a control system for association with a battery and a generator, means for selectively connecting the battery and generator in parallel comprising an electromagnetic relay including a pair of electrical contacts, an armature controlling said contacts, and a winding controlling said armature; said winding being effective when a voltage greater than a first preselected magnitude is applied thereacross to operate said armature and contacts and effective to hold said armature and contacts operated when the voltage thereacross is greater than a second and lower preselected magnitude, the voltage across said winding exceeding said first magnitude when the output voltage of the generator exceeds the output voltage of the battery by a preselected difference, means including said contacts for interconnecting said battery and generator to reduce said voltage difference effectively to zero, and means for maintaining across said winding a voltage greater than said second preselected magnitude.

2. In a control system for association with a battery and a generator, means for selectively connecting the battery and generator in parallel comprising an electromagnetic relay including a pair of electrical contacts, an armature controlling said contacts, and a winding controlling said armature; said winding being effective when a voltage greater than a first preselected magnitude is applied thereacross to operate said armature and contacts and effective to hold said armature and contacts operated when the voltage thereacross is greater than a second and lower preselected magnitude, the voltage across said winding exceeding said first magnitude when the output voltage of the generator exceeds the output voltage of the battery by a preselected difference, means including said contacts for interconnecting said battery and generator to reduce said voltage difference effectively to zero, and means effective upon the operation of said contacts for maintaining across said winding a voltage greater than said second preselected magnitude.

3. In a control system for association with a battery and a generator, means for selectively connecting the battery and generator in parallel comprising an electromagnetic relay including a pair of electrical contacts, an armature controlling said contacts, and a winding controlling said armature; said winding being effective when a voltage greater than a first preselected magnitude is applied thereacross to operate said armature and contacts and effective to hold said armature and contacts operated when the voltage thereacross is greater than a second and lower preselected magnitude, the voltage across said winding exceeding said first magnitude when the output voltage of the generator exceeds the output voltage of the battery by a preselected difference, means including said contacts for interconnecting said battery and generator to reduce said voltage difference effectively to zero, means for maintaining across said winding a voltage greater than said second preselected magnitude, and means including a second winding on said relay responsive to reverse current through said generator for opposing the effect of said first winding and releasing said armature and contacts.

4. In a control system for association with a battery and a generator, means for selectively connecting the battery and generator in parallel comprising an electromagnetic relay including a pair of electrical contacts, an armature controlling said contacts, and a winding controlling said armature; said winding being effective when a voltage greater than a first preselected magnitude is applied thereacross to operate said armature and contacts and effective to hold said armature and contacts operated when the voltage thereacross is greater than a second and lower preselected magnitude, the voltage across said winding exceeding said first magnitude when the output voltage of the generator exceeds the output voltage of the battery by a preselected difference, means including said contacts for interconnecting said battery and generator to reduce said voltage difference effectively to zero, means for maintaining across said winding a voltage greater than said second preselected magnitude, and means including a second winding on said relay responsive to forward current through said generator for aiding the effect of said first winding and responsive to reverse current through said generator for opposing the effect of said first winding and releasing said armature and contacts.

5. In a control system for association with a battery and a generator having a series field and a voltage drop of a first polarity across the field when the generator is producing output current, means for selectively connecting the battery and generator in parallel comprising a pair of electrical contacts, electromagnetic means responsive to the attainment of a preselected difference between the output voltages of the battery and the generator for operating said contacts, means including said contacts for interconnecting said battery and generator to reduce said voltage difference effectively to zero, means for electromagnetically maintaining said contacts operated despite the reduction of said voltage difference to zero, and means responsive to a voltage across the field of a polarity opposite to the first polarity for releasing said contacts.

6. In a control system for association with a battery and a generator having a series field and a voltage drop of a first polarity across the field when the generator is producing output current, means for selectively connecting the battery and generator in parallel comprising an electromagnetic relay including a pair of electrical contacts, an armature controlling said contacts, and a winding controlling said armature; said winding being effective when a voltage greater than a first preselected magnitude is applied thereacross to operate said armature and contacts and effective to hold said armature and contacts operated when the voltage thereacross is greater than a second and lower preselected magnitude, the voltage across said winding exceeding said first magnitude when the output voltage of the generator exceeds the output voltage of the battery by a preselected difference, means including said contacts for interconnecting said battery and generator to reduce said voltage difference effectively to zero, means for maintaining across said winding a voltage greater than said second preselected magnitude, and means including a second winding on said relay connected in parallel with the field and responsive to voltage across the field of the first polarity for aiding the effect of said first winding and responsive to voltage across the field of a polarity opposite to the first polarity for releasing said armature and contacts.

7. In a control system for association with a battery and a generator, control means for selectively connecting the generator and battery in parallel, relay means effective when the voltage across the generator exceeds a preselected value smaller than the battery voltage for enabling said control means, selectively operable means for connecting the battery and generator in parallel for motorizing the generator, and means for disabling said relay means comprising selectively operable means for reducing the voltage difference across said winding below said preselected value.

8. In a control system for association with a battery and a generator, each having first and second output terminals, the first terminals being electrically interconnected, control means for selectively interconnecting the second terminals, relay means including a winding having two ends, means connecting one end of said winding to the second terminal of the generator, a resistor, means including said resistor for connecting the other end of said winding to the first generator terminal, manually operable means for interconnecting the second terminals for motorizing the generator, and means for disabling said relay means comprising manually operable means for interconnecting the second terminal of the battery to said other end of said winding.

References Cited in the file of this patent
UNITED STATES PATENTS

| Number | Name | Date |
|---|---|---|
| 374,673 | Griscom | Dec. 13, 1887 |
| 1,231,753 | Lee | July 3, 1917 |
| 1,281,827 | Phillips | Oct. 15, 1918 |
| 1,389,701 | Ross | Sept. 6, 1921 |
| 1,746,726 | Creveling | Feb. 11, 1930 |
| 2,013,618 | Woodbridge | Sept. 3, 1935 |
| 2,067,420 | Seeger et al. | Jan. 12, 1937 |
| 2,425,092 | Fisher | Aug. 5, 1947 |
| 2,683,850 | Weber et al. | July 13, 1954 |

UNITED STATES PATENT OFFICE

CERTIFICATE OF CORRECTION

Patent No. 2,806,962 September 17, 1957

Chester C. Quantz

It is hereby certified that error appears in the printed specification of the above numbered patent requiring correction and that the said Letters Patent should read as corrected below.

Column 3, line 69, after the word "between" insert -- conductor 24 and ground and the voltage appearing between --; column 4, line 29, after "voltage" insert -- between --.

Signed and sealed this 31st day of December 1957.

(SEAL)

Attest:
KARL H. AXLINE
Attesting Officer

ROBERT C. WATSON
Commissioner of Patents